United States Patent
Das et al.

(10) Patent No.: US 10,880,183 B2
(45) Date of Patent: Dec. 29, 2020

(54) METHOD AND SYSTEM FOR TRANSMITTING PACKETS WITHIN NETWORK

(71) Applicant: Wipro Limited, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 65 days.

(21) Appl. No.: 16/281,457

(22) Filed: Feb. 21, 2019

(65) Prior Publication Data

US 2020/0213204 A1 Jul. 2, 2020

(30) Foreign Application Priority Data

Dec. 28, 2018 (IN) .............................. 201841049530

(51) Int. Cl.
| H04L 12/24 | (2006.01) |
| H04L 12/891 | (2013.01) |
| H04L 12/841 | (2013.01) |
| H04L 12/947 | (2013.01) |

(52) U.S. Cl.
CPC ............ H04L 41/16 (2013.01); H04L 47/283 (2013.01); H04L 47/41 (2013.01); H04L 49/252 (2013.01)

(58) Field of Classification Search
CPC combination set(s) only.
See application file for complete search history.

(56) References Cited

U.S. PATENT DOCUMENTS

| 6,097,703 A | 8/2000 | Larsen et al. |
| 6,157,616 A | 12/2000 | Whitehead |
| 2009/0135726 A1 | 5/2009 | Balan et al. |
| 2009/0323528 A1 | 12/2009 | Loacono et al. |
| 2012/0008626 A1* | 1/2012 | Brederveld .......... G06Q 10/087 370/392 |
| 2020/0076842 A1* | 3/2020 | Zhou .................... G06K 9/6232 |

FOREIGN PATENT DOCUMENTS

| CA | 1193692 A | 9/1985 |
| WO | 03005630 A2 | 1/2013 |

* cited by examiner

*Primary Examiner* — El Hadji M Sall
(74) *Attorney, Agent, or Firm* — Finnegan, Henderson, Farabow, Garrett & Dünner, LLP

(57) ABSTRACT

A method and system of transmitting packets within a network is disclosed. The method includes determining frequency and sequence of transmission for a plurality of packets within the network. The method further includes identifying a set of recurrent packets from the plurality of packets based on the determined frequency and sequence of transmission. The method includes training a neural network based on the identified set of recurrent packets to identify recurrent packets. The method further includes generating a packet checkpoint based on the trained neural network. The method includes regenerating one or more of the set of recurrent packets in response to a request for the set of recurrent packets, based on the packet checkpoint.

18 Claims, 5 Drawing Sheets

METHOD AND SYSTEM FOR
TRANSMITTING PACKETS WITHIN
NETWORK

TECHNICAL FIELD

This disclosure relates generally to communication networks, and more particularly to method and system for transmitting packets within a network.

BACKGROUND

Data center is one of the basic requirement of enterprise storage and networking in order to store data in bulk. Some conventional methods aim to build a data center in most optimized and efficient way so as to avoid packet collisions while transmission of data in multi-topology environment. However, any networked architecture may face the issues of data loss, inefficient data transfer, and inadequate bandwidth utilization. Moreover, packet collisions in these networked architecture may also result in less strength of damaged packets, which reduces the efficiency of the service and reduces the ratio of packets delivery to a destination node.

Some conventional methods for reducing packet collision are available. However, these conventional methods are not efficient and cannot be adopted for dynamic multi-interface topologies. The reason is that for each packet to reach safely to a destination node, a subsequent packet may need to wait until an acknowledgment for the receipt of the current packet has been received. If the current packet gets delayed due to an interrupt, then the current packet is destroyed and is sent again to the destination node. Additionally, there may be a timeout issue, which may lead to inconsistency in managing the Input Output Per Second (IOPS).

Additionally, these conventional methods take a lot of time to sense free route and require more amount of cache in a switch for holding the packets temporarily, while the free route is being sensed. The computational overhead of usage of such algorithms is very high. Moreover, for sending every packet, a free route needs to be sensed and measured in order to avoid packet collisions. This worsens while the network is connecting to multiple devices and transacting IOPS at the same time.

The conventional systems are not able to detect or avoid the collision in the multi-topology environment. Moreover, if there is a collision, there may be a non-recoverable loss of data and there may be a delay in sensing the channel for availability. This may increase the latency due to sensing signals computation. Packet collisions may also slow down the network and clog the bandwidth with retransmissions, which further increases the Central Processing Unit (CPU) latency. The collision detection mechanism used by some conventional methods may be restricted for shorter length of the cable segments. As a result, they are inappropriate for large/active networks.

SUMMARY

In one embodiment, a method of transmitting packets within network is disclosed. In one embodiment, the method may include determining frequency and sequence of transmission for a plurality of packets within the network. The method may further include identifying a set of recurrent packets from the plurality of packets based on the determined frequency and sequence of transmission. The method may further include training a neural network based on the identified set of recurrent packets to identify recurrent packets. The method may further include generating a packet checkpoint based on the trained neural network and the method may further include regenerating one or more of the set of recurrent packets in response to a request for the set of recurrent packets, based on the packet checkpoint.

In another embodiment, a system comprising a network device for transmitting packets within a network comprising a plurality of switches is disclosed. The system includes a processor and a memory communicatively coupled to the processor, wherein the memory stores processor instructions, which, on execution, causes the processor to determine frequency and sequence of transmission for a plurality of packets within the network. The processor instructions further cause the processor to identify a set of recurrent packets from the plurality of packets based on the determined frequency and sequence of transmission. The processor instructions cause the processor to train a neural network based on the identified set of recurrent packets to identify recurrent packets. The processor instructions further cause the processor to generate a packet checkpoint based on the trained neural network. The processor instructions cause the processor to regenerate one or more of the set of recurrent packets in response to a request for the set of recurrent packets, based on the packet checkpoint.

In yet another embodiment, a non-transitory computer-readable storage medium is disclosed. The non-transitory computer-readable storage medium has instructions stored thereon, a set of computer-executable instructions causing a computer comprising one or more processors to perform steps comprising determining, frequency and sequence of transmission for a plurality of packets within the network; identifying a set of recurrent packets from the plurality of packets based on the determined frequency and sequence of transmission; training a neural network based on the identified set of recurrent packets to identify recurrent packets; generating a packet checkpoint based on the trained neural network; and regenerating one or more of the set of recurrent packets in response to a request for the set of recurrent packets, based on the packet checkpoint.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
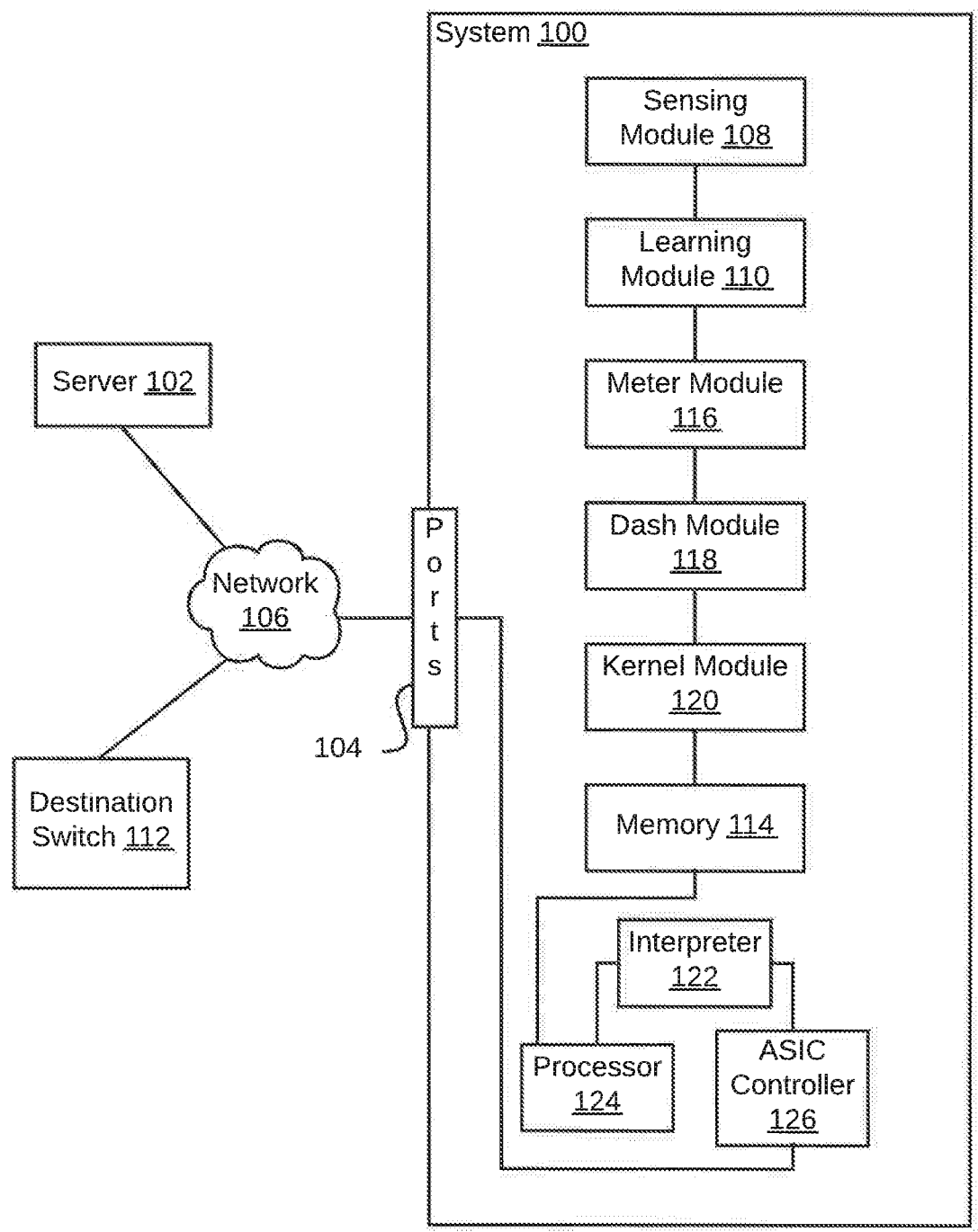
FIG. 1 is a block diagram illustrating a system for regenerating and transmitting packets within a network, in accordance with an embodiment.

In one embodiment, a system 100 for regenerating and transmitting packets within a network is illustrated in the FIG. 1, in accordance with an embodiment. As will be appreciated, the system 100 is independent of a network topology and may be implemented in any type of network topology. Examples of network topologies may include, but are not limited to, point to point topology, arbitrated fiber channel topology, current state of optimization topology, bus topology, star topology, or fiber switch topology. The system 100 may be implemented in a variety of computing systems, for example, but not limited to a handheld device, a laptop, a desktop, a switch, a gateway, a router, or a server. The system 100 may be employed to support an application or to provide a service. Examples of the application or the service may include, but are not limited to On-line Transaction Processing (OLTP), ATM, or On-line Analytic Processing (ONAP).

To this end, various modules in the system 100 may access information stored in a server 102, via one or more of ports 104. The server 102 may be communicatively coupled to the ports 104 through a network 106. The network 106 may be a wired or a wireless network including, but not limited to the Internet, wireless local area network (WLAN), Wi-Fi, Long Term Evolution (LTE), worldwide interoperability for microwave access (WiMAX), and general packet radio service (GPRS).

In the system 100, a dash module 118 may track packets that are being transmitted amongst a plurality of switches in the network. Based on the tracking, the dash module 118 may identify a set of recurrent packets, which are being repeatedly transmitted between two or more of the plurality of switches. This is further explained in detail in conjunction with FIG. 2 and FIG. 3. The dash module 118 may share information regarding the set of recurrent packets with a learning module 110 in the system 100. The learning module 110 may receive the information and may create a packet checkpoint based on the information. The packet checkpoint may include details associated with packets that may be regenerated by the learning module 110 and/or an intermediate switch. Thus, a request for such packets may not be routed to a destination switch 112, which may be connected to the system 100 via the network 106. This is further explained in detail in conjunction with FIG. 2.

A sensing module 108 in the system 100 may derive a plurality of network parameters from the packets transmitted amongst the plurality of switches and may initialize the plurality of network parameters into a plurality of dependent variables and a plurality of independent variables. Examples of the network parameters may include, but are not limited to cache size, topology band width, cache transaction, CPU usage, fragmentation ratio, packet size, jitter rate or the like.

The sensing module 108 may then perform multilinear regression analysis over one or more dependent and independent variables to determine or predict future values for one or more dependent variables. This is further explained in detail in conjunction with FIG. 2. The sensing module 108 may also store the future values predicted for the one or more dependent variables in a memory 114.

Based on the future values predicted for the one or more dependent variables, a meter module 116 may, for example, measure delay and speed for each packet and may cluster the packets into multiple categories based on the measured delay and speed. The categories, for example, may include, but are not limited to a high delay category, a moderate delay category, and a least delay category. These are further explained in detail in conjunction with FIG. 2 and FIG. 4.

Based on the assigned categories, the dash module 118 may transmit one or more packets according to propagation delay and traversal delay to the destination switch 112 through one or more switches (not shown in FIG. 1) in the network.

The system 100 may further include a kernel module 120 which is an operating system for the system 100. The kernel module 120 may receive data from various modules in the system 100 and may further share the data with an interpreter 122 that may convert the received data into a format that is readable by hardware units that are present within the system 100 and are externally coupled to the system 100

The set of instructions and algorithms that enable functioning of the system 100 are stored in a processor 124, which may include a volatile memory (for example, Random Access Memory (RAM) or the like). The system 100 may further include an Application-Specific Integrated Circuit (ASIC) controller 126 that may be communicatively coupled to the interpreter 122 and may provide information associated with the destination switch 112 to various modules within the system 100. The information associated with the destination switch 112 may include, but is not limited to an Internet Protocol (IP) address, port identifier, or bandwidth requirement of the destination switch 112.

Figure 2:
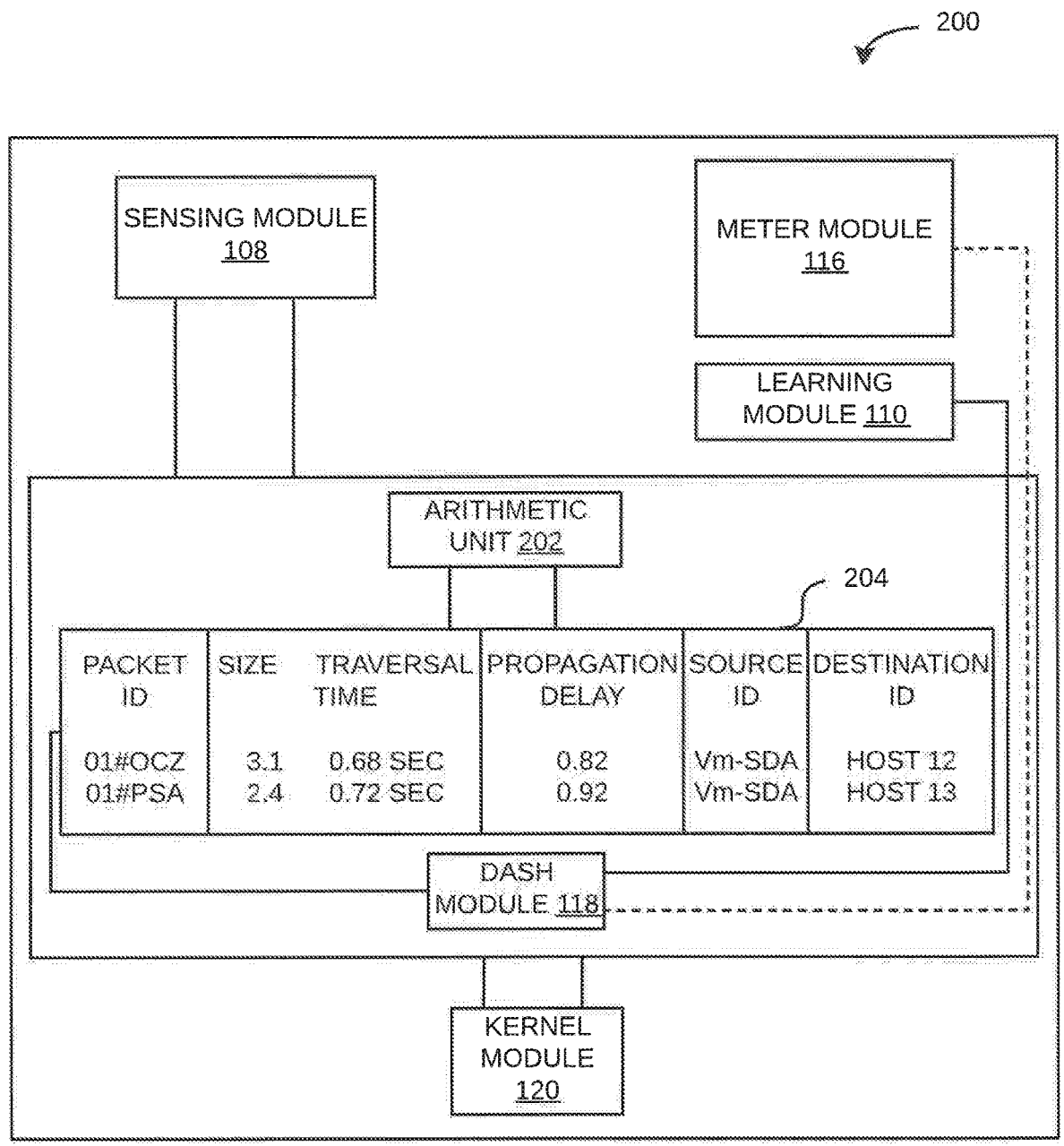
FIG. 2 is a block diagram illustrating an internal architecture of a system for regenerating and transmitting packets within a network, in accordance with an exemplary embodiment.

Referring now to FIG. 2, a block diagram of an internal architecture of a system 200 for regenerating and transmitting packets within a network is illustrated, in accordance with an embodiment. The system 200 is a subset of the system 100, such that, the system 200 may include the sensing module 108, the learning module 110, the dash module 118, the kernel module 120, and an arithmetic unit 202 that may reside in the memory 114. The system 200 may be implemented in a variety of computing systems, for example, but not limited to a smartphone, a dedicated handheld device, a tablet, a switch, a gateway, a router, or a server. The system 200 may be adapted to exchange data with other components or service providers using a wide area network or the Internet. As will be appreciated by those skilled in the art, all such aforementioned modules 108, 110, 116, 118, 120, and 202 may be represented as a single module or a combination of different modules. Moreover, as will be appreciated by those skilled in the art, each of the modules 108, 110, 116, 118, 120, and 202 may reside, in whole or in parts, on one device or multiple devices in communication with each other.

The dash module 118 may track a plurality of packets exchanged between the system 200 and the destination switch 112 in order to determine frequency and sequence of transmission for the plurality of packets. Thereafter, the dash module 118 may compare the frequency of transmission of the plurality of packets with a predefined frequency threshold. Additionally, the dash module 118 may compare a frequency of a set of packets which are transmitted in a sequence, with a predefined sequence threshold. When the set of packets match or exceed the predefined frequency threshold and the predefined sequence threshold, the dash module 118 may identify the set of packets as a set of recurrent packets that are exchanged between the system 200 and the destination switch 112. In other words, the set of recurrent packets are frequently exchanged between the system 200 and the destination switch 112. Moreover, the sequence of exchange of the set of recurrent packets is also the same during every exchange. It will be apparent to a person skilled in the art that the dash module 118 may identify multiple such sets of recurrent packets. By way of an example, a user may frequently access a bank website and may access the weblink through a browser. In this case, each time the user accesses the bank website, the packets that are associated with contents on a login page of the website are transmitted to the system 200 from the destination switch 112 in the same sequence. However, the packets associated with the login details, i.e., the user Identifier (ID) and the password may vary, based on a user accessing the bank website. Thus, in this case, the dash module 118 may identify the packets that are associated with contents on the login page as the set of recurrent packets.

The dash module 118 may then share the information associated with the set of recurrent packets with the learning module 110. The learning module 110 may include a neural network that may be trained based on the set of recurrent packets to identify recurrent packets and generate a packet checkpoint. The packet checkpoint may include details associated with recurrent packets. The learning module 110 may then regenerate the set of recurrent packets requested from the destination switch 112. To this end, the learning module 110 may include three sections, i.e., input neural nodes, a hidden layer, and output neural nodes. The number of input neural nodes may be determined using the number of packets that are to be regenerated. The hidden layer may vary from the number of input neural nodes to the number of the output neural nodes. A weight of the hidden layer may be multiplied with an input neural node to generate an output neural node, which may be a regenerated packet. In the same manner, the learning module 110 may perform incremental learning and may predict the output (which would be a regenerated packet) of an output neural node, based on the input (which would be a request for a packet from the destination switch 112) received by an input neural node. The learning module 110 may regenerate requested packets on the base network layer, thus the traversal of packets between the system 200 and the destination switch 112 is reduced, thereby reducing multiple packet collisions on one or more packet traversal routes in the network.

The sensing module 108 may sense a transmission route between the destination switch and the system 200 without any hardware interpretation or signal transmission. The sensing module 108 may also determine network parameters associated with a plurality of packets transmitted and received by the system 200 in the past. In an embodiment, the sensing module 108 may determine network parameters of packets transmitted in pre-defined interval, based on the associated size of these packets. Examples of the network parameters may include, but are not limited to latency rate, propagation or traversal delay, jitter rate, source id, destination id, queue depth, throughput, network speed or timeout. The sensing module 108 may initialize the parameters into a plurality of dependent variables and a plurality of independent variables. Examples of the dependent variables may include, but are not limited to IOPS, bandwidth jitter rate, latency, or error rate. Similarly, examples of the independent variables may include, but are not limited to cache size, cache transaction, CPU usage, fragmentation ratio, packet size, jitter rate, or buffer consumption.

Further, the sensing module 108 may perform multilinear regression analysis over one or more dependent and independent variables in order to predict future values of the one or more dependent variables. Further, the sensing module 108 shares the future values predicted for the one or more dependent variables with the meter module 116. This is further explained in detail in conjunction with FIG. 3.

Based on the future values predicted for the one or more dependent variables, the meter module 116 may cluster the packets into a plurality of categories. The plurality of categories may include, but are not limited to a high delay category, a moderate delay category, and a least delay category. Each category may be associated with a predefined value range for the one or more dependent variables. This is further explained in detail in conjunction with FIG. 3. In an embodiment, based on the future values predicted for the one or more dependent variables, the meter module 116 may measure delay and speed information associated with packets and may accordingly cluster the packet as explained above. In this case, the high delay category may represent packets which may consume more amount of time for propagation from one switch to another switch in the network. Additionally, packets clustered in the high delay category may need more execution time, may be heavy, or may need acknowledgment from child switches. On the other hand, the moderate delay category may represent packets that are associated with moderate delay and the least delay category may represent packets that are associated with least delay or less computation time.

The plurality of categories enables the dash module 118 to manage traversal of packets according to real-time operation and state of a path to be used for packet traversal. Based on the categories assigned to the packets, the dash module 118 may manage release and acceptance of packets from the system 200. To this end, the dash module 118 may release one or more packets from a particular category for traversal on a path, when propagation delay and traversal time for the path matches predefined threshold associated with that category. By way of an example, when the propagation delay and traversal time for a path matches the predefined threshold for the high delay category, the dash module 118 may release one or more packets clustered in the high delay category.

The dash module 118 may also receive real-time value of network parameters (initialized as dependent and independent variables) from the sensing module 108 and may record the real-time values in the arithmetic unit 202 as a table 204. In an exemplary embodiment, for a packet, the table 204 may include a packet ID, a packet size, traversal time for the packet, propagation delay associated with the packet, a source ID of the packet, and a destination ID of the packet. By way of an example, as depicted in FIG. 2, for a packet, the table 204 may include a packet ID as '01#OCZ,' size as '3.1,' traversal time as '0.68 seconds,' propagation delay as '0.82 seconds,' a source ID as 'Vm-SDA,' and a destination ID as 'HOST 12.' The arithmetic unit 202 may be used to store additional information provided by the kernel module 120. The additional information, for example, may include but is not limited to jitter rate, latency, source IP address, destination IP address, or an IOPS rate.

The modules within the system 200 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), Simple To Design (STD) Bus, Recommended Standard (RS)-232, RS-422, RS-485, I2C, Serial Peripheral Interface (SPI), Microwire, 1-Wire, IEEE 1284, Intel Quick Path Interconnect, InfiniBand, or Peripheral Component Interconnect Express (PCIe) etc.

Figure 3:
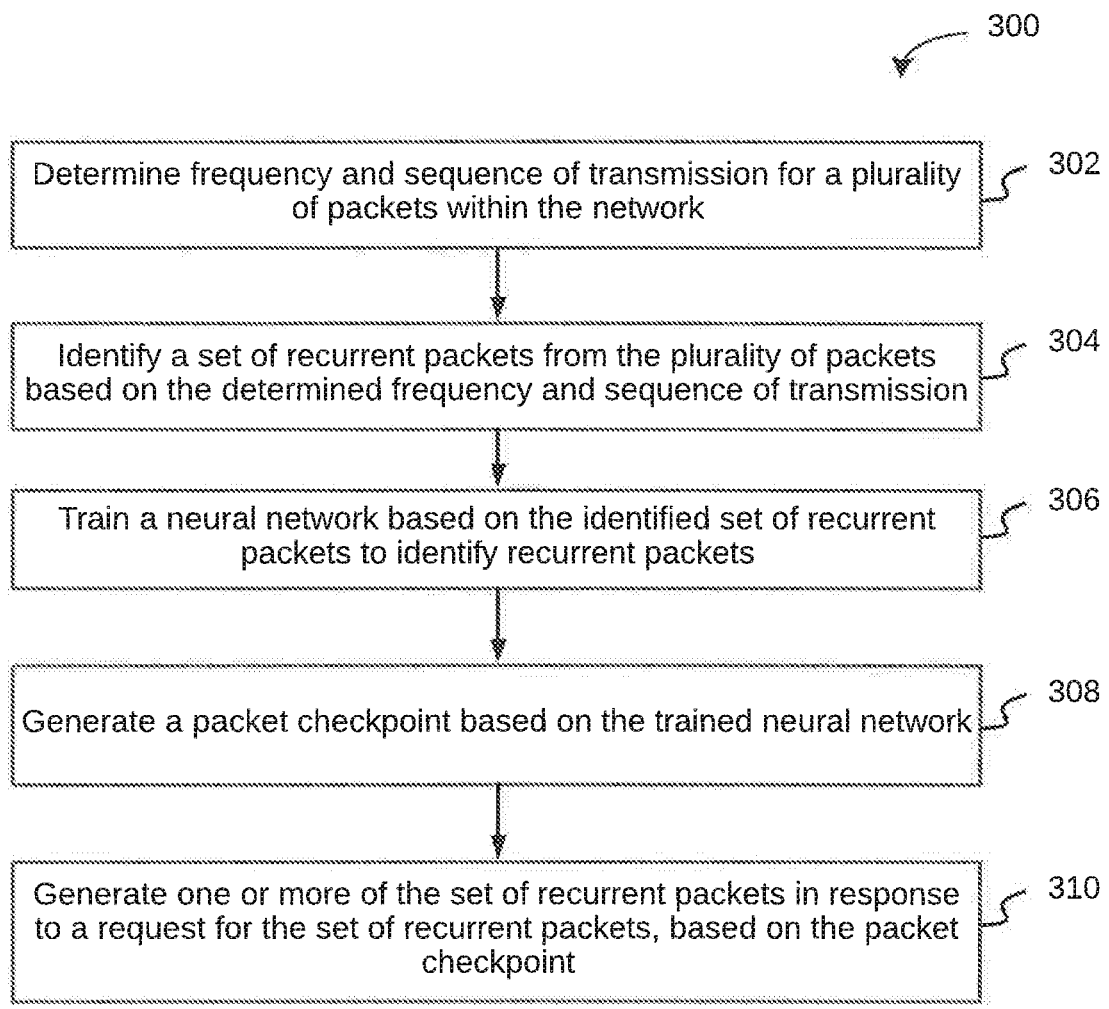
FIG. 3 illustrates a flowchart of a method for transmitting packets within a network, in accordance with an embodiment.

Referring now to FIG. 3, a flowchart of a method 300 for transmitting packets within a network that includes a plurality of switches is illustrated, in accordance with an embodiment. The method 300 may be executed by a network device, which, for example, may include or implement the system 200. The network device, for example, may be a router, a switch, a gateway, a server, or a laptop/desktop installed with a Network Interface Card (NIC) card.

At step 302, the network device may determine the frequency and sequence of transmission for a plurality of packets within the network. Thereafter, at step 304, the network device may identify the set of recurrent packets. It will be apparent to a person skilled in the art that the network device may identify multiple such sets of recurrent packets. To this end, the network device may compare the frequency of transmission of the plurality of packets with a predefined frequency threshold. Additionally, the network device may compare a frequency of a set of packets from the plurality of packets that are transmitted in a sequence with a predefined sequence threshold. Based on the above comparison, the network device may identify the set of packets as the set of recurrent packets as they match each of the predefined frequency threshold and the predefined sequence threshold. In other words, the frequency of transmission of the packets within the set of recurrent packets crosses the predefined frequency threshold. Additionally, the packets in the set of recurrent packets are transmitted in a sequence and the number of such transmissions crosses the predefined sequence threshold. By way of an example users accessing the network through the network device may frequently access a bank website and may access the weblink through a browser. In this case, each time a user access the bank website, the packets that are associated with contents on a login page of the website are transmitted to the network device from a destination switch or node in the same sequence. However, the packets associated with the login details, i.e., the user ID and the password may vary, based on the user accessing the bank website. Thus, the network device may identify the packets that are associated with contents on the login page as the set of recurrent packets.

Based on the identified set of recurrent packets, at step 306, the network device may train a neural network to identify recurrent packets in the network. The neural network may be a Long Short Term Memory (LSTM) network or a Recurrent Neural Network (RNN). The neural network may take the identified set of recurrent packets in form of a sequence. Packets which are repetitive and duplicate with same set of frequency will be automated by learning the data sequence. The neural network may at first store all such sets of recurrent packets and may learn the packet sequence. The neural network then automates generation of same sequence of packets rather than sending the packets into the network. In an embodiment, based on the sequence and time instance, packets may be mapped in terms of neurons in the neural network. One packet may be represented as single hot encoded vector, which may be a single neuron encoder. The number of packets may be proportional to the number of neuron layers. By way of an example, $x_1$ may be a hot encoded vector corresponding to the second word of a sentence and $S_t$ may be the hidden state at time t, which is the memory of the neural network. $S_t$ may be calculated based on previous hidden state and the input at the current step. In an exemplary embodiment, equation 1 given below may be used to compute $S_t$.

$$S_t = f(Ux_t + WS_{\{t-1\}}) \quad (1)$$

where,
f is a nonlinearity such as tan h or ReLU,
$x_t$ may be a hot encoded vector at time t,
$S_{\{t-1\}}$ is the hidden state at time (t−1),
U and W are different network parameters Based on the equation 1, an output $o_t$ is computed at time t using the equation 2 given below:

$$o_t = \mathrm{softmax}(Vs_t) \quad (2)$$

where,
V is a network parameter.

In an exemplary scenario, the output of the software layer may be lie in the probabilistic range of "0" to "1". If the prediction is very strong towards positive then the value might range between "0.8" to "1.0", whereas if the model predicts to be negative, the values might be range between "0.15" to "0.3".

The hidden state $s_t$ may be the memory of the neural network and captures information about what happened in all previous time steps in the neural network. As stated above in equation 2, the output $o_t$ is determined solely based on the memory at the time t. The neural network shares the same parameters as stated in equations 1 and 2 (i.e., U, V, and W) across all steps. Thus, the same task is performed at each step, just with different inputs. This considerably reduces the total number of parameters that the neural network may need to perform learning.

In response to the training, at step 308, network device may generate a packet checkpoint based on the trained neural network. In an embodiment, the neural network may generate the packet checkpoint after gaining an accuracy above a predefined threshold. The packet checkpoint may include details associated with recurrent packets, which may be used to regenerate one or more packets at the network device. The neural network may update the packet checkpoint to the kernel module 120, which may store the packet checkpoint in the OS file system. The network device may also share the packet checkpoint within each of the plurality of switches and accordingly the packet checkpoint may be stored in each of the plurality of switches.

The neural network may also be trained to regenerate packets based on the details in the packet checkpoint. In an embodiment, details for a packet may include a set of bits in an encapsulated form that are traversed in the form of a signal in the network. By way of an example, some acknowledgement packet or request packets have a fixed set of bits, which may be used to identify a request received from a user. The neural network may also be trained to track and learn correlation and associativity between packets in order to regenerate packets. In an embodiment, the neural network may create and incrementally augment a set of correlation and associativity rules, based on the learning, in order to regenerate packets.

Based on the packet checkpoint, the network device may regenerate, at step 310, one or more of the set of recurrent packets in the same sequence, in response to a request for the set of recurrent packets. In an embodiment, when a request for packets is received, the request may first be parsed through the packet checkpoint, which further predicts the request. If the prediction is successful (prediction accuracy may vary between 85%-95%), set of recurrent packets from the request are generated using detail in the packet checkpoint. The request for the set of recurrent packets may be generated by a source switch for a destination node. The one or more of the set of recurrent packets may be regenerated within the source switch or by an intermediate switch between the source switch and the destination node. In other words, without the request being transmitted in the network or to the destination node, one or more of request packets may be regenerated at the source switch itself. This helps in reducing packets transmission, congestion, and enables gain control as the required signal to be traversed is reduced.

Once the network device regenerates the one or more of the set of recurrent packets, remaining packets (which cannot be regenerated) requested by the source switch may be transmitted by the destination switch, after receiving the request. To this end, the network node may derive a plurality of network parameters associated with the plurality of switches from the plurality of packets. Examples of the network parameters may include, but are not limited to latency rate, propagation or traversal delay, jitter rate, source id, destination id, queue depth, throughput, network speed or timeout. For each of the plurality of switches, the network node may then initialize the plurality of network parameters into a plurality of dependent variables and a plurality of independent variables.

The network device may then perform multilinear regression analysis on one or more dependent and independent variables, in order to predict future values for the one or more dependent variables. The predicted future values are then used to cluster the remaining packets into a plurality of categories. The network device then transmits each of the remaining packet based on an associated category from the plurality of categories. This is further explained in detail in conjunction with FIG. 4.

Figure 4:
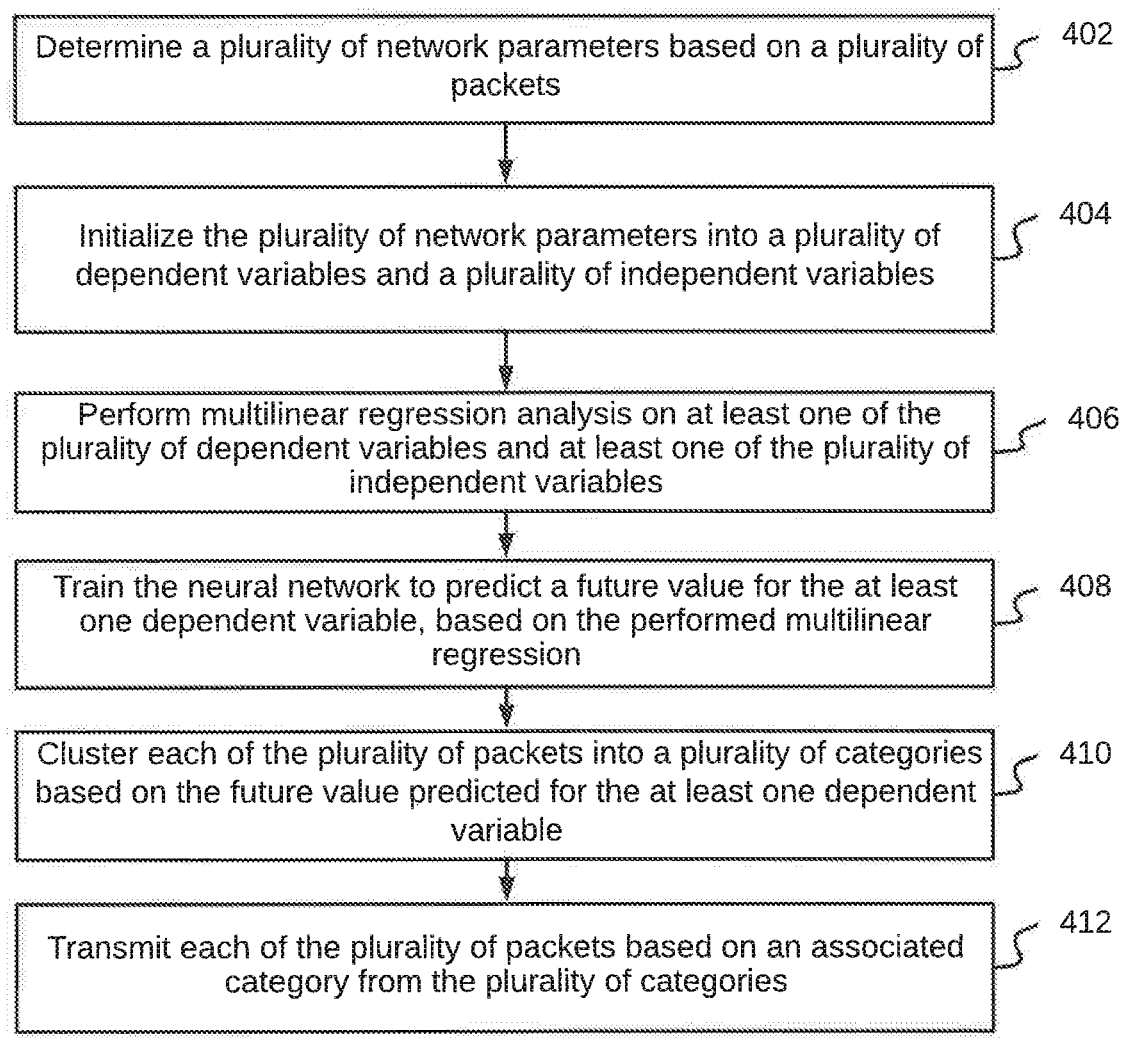
FIG. 4 illustrates a flowchart of a method for clustering packets into a plurality of categories and transmitting the packets based on the plurality of categories amongst a plurality of switches, in accordance with an embodiment.

Referring now to FIG. 4, a flowchart of a method for clustering packets into a plurality of categories and transmitting the packets based on the plurality of categories amongst a plurality of switches is illustrated, in accordance with an embodiment. At step 402, a plurality of network parameters may be derived from a plurality of packets. The plurality of parameters may be associated with the plurality of switches. The plurality of packets may be packets that have already been transmitted in the past and have reached a destination node. Examples of the network parameters may include, but are not limited to latency rate, propagation or traversal delay, jitter rate, source ID, destination ID, queue depth, throughput, network speed, or timeout.

At step 404, the plurality of network parameters may be initialized into a plurality of dependent variables and a plurality of independent variables for each of the plurality of switches. Examples of the dependent variables may include, but are not limited to IOPS, bandwidth jitter rate, latency, or error rate. Similarly, examples of the independent variables may include, but are not limited to cache size, cache transaction, CPU usage, fragmentation ratio, packet size, jitter rate, or buffer consumption.

At step 406, multilinear regression analysis is performed on one or more of the plurality of dependent variables and one or more of the plurality of independent variables in order to predict future values of the one or more dependent variables. In other words, historical data of network parameters is used to predict future values of the one or more dependent variables. At step 408, the neural network may be trained to predict the future values of the one or more dependent variables, based on the performed multilinear regression. In an embodiment, the value of a dependent variable may be predicted by calculating the slope and intercept of the multilinear regression analysis performed on values of the initialized dependent and independent variables.

Dependent variables may be represented as Y and independent variables may be represented as X. In an exemplary embodiment, a multilinear regression algorithm may compute the square of values of the X variables and the Y variables in order to reduce the negative values. Thereafter, the multilinear regression algorithm computes a product of values of each X variable with each Y variable. For example, if there are three X variables, i.e., X1 to X3, and one Y variable, i.e., Y, the multilinear regression algorithm may compute the product as: [X1.Y, X2.Y, and X3.Y]. Thereafter, the multilinear regression algorithm may compute an average value for the X variables (represented by Xavg) and an average value for the Y variables (represented by Yavg). Based on the above determined values, the multilinear regression algorithm predicts the value of the Y variables using the equation 3 given below:

$$Y = \text{alpha} + \text{beta}(X) \quad (3)$$

where, alpha=Yavg−beta(X), which is the intercept of the multilinear regression analysis, beta(X)=SXY/SXX, which is the slope of the multilinear regression analysis, SXY=Sum (XiYi)−n(Xavg. Yavg), where n represents the total number of unique values of an X variable SYY=Sum(Y−Yavg)$^2$, SXX=Sum(X2)−n(Xavg).

By way of an example of the exemplary embodiment given above, the X variable is taken as the "size of data dropped" and the Y variable to be predicted is taken as "the time required to drop the packets." A table 1 given below is used to represent various computations done based on the exemplary embodiment given above.

TABLE 1

| X (MB) | Y (S) | X1$^2$ | Y1$^2$ | X$_i$Y |
|---|---|---|---|---|
| 6 | 40 | 36 | 1600 | 240 |
| 4.5 | 35 | 20.25 | 1225 | 157.5 |
| 1 | 12 | 1 | 144 | 12 |
| 3.75 | 26 | 14.06 | 676 | 97.5 |
| 5.2 | 39 | 27.04 | 1521 | 202.8 |
| 6.9 | 49 | 47.61 | 2401 | 338.1 |
| 8.4 | 62 | 70.56 | 3844 | 520.8 |
| 4.7 | 36 | 22.09 | 1296 | 169.2 |
| 7.3 | 58 | 53.29 | 3364 | 423.4 |
| 11.4 | 90 | 129.96 | 8100 | 1026 |
| ΣX = 59.15 | ΣY = 447 | ΣX1$^2$ = 421.86 | ΣY1$^2$ = 24171 | ΣX$_i$Y = 3187.3 |

In the table 1, the first column includes multiple values of the X variable and the second column includes multiple values of the Y variables derived based on packets that have been transmitted and delivered in the past. Further, the third and fourth column represent the square of X and Y variables respectively, and the fifth column represents the product of X and Y variables. Additionally, in the table 1, a sum of each column is represented in the last row. A person of ordinary skill in the art will appreciate that the variables X and Y may correspond to any physical parameter whose value is to be predicted. Based on the values in the table 1, the equations 4 to 9 are executed:

$$Sxx = \sum (x_i - \bar{x})^2 \quad (4)$$
$$= \left(\sum X1^2\right) - n(\bar{x})^2$$
$$= 421.86 - 10(5.915)$$
$$= 421.86 - 10(34.99$$
$$= 421.86 - 349.9$$
$$= 71.96$$

where, $$\bar{x} = \sum X/10 = 59.15/10 = 5.915 \quad (5)$$

$$Sxy = \sum (xi - \bar{x})(yi - \bar{y}) = \left(\sum xiyi\right) - n(\bar{x})(\bar{y})$$
$$= 3187.3 - 10(5.915)(44.7)$$
$$= 3187.3 - 2644$$
$$= 543.3$$

where, $$\bar{y} = \sum Y/10 = 447/10 = 44.7 \quad (6)$$

$$Syy = \sum (yi - \bar{y})^2 = \left(\sum yi^2\right) - n(\bar{y})^2$$
$$= 24171 - 447$$
$$= 23724$$

$$y = \alpha + \beta x \quad (7)$$

where,
y is the time required to drop packets,
x is the value of data dropped.
The value of β, which is the slope, is derived based on equations 4 and 5, as depicted in the equations 8 below:

$$\beta = Sxy/Sxx \quad (8)$$
$$= 543.3/71.96 = 7.55,$$

Further, the value of α is derived based on equations 5 and 6, as depicted in the equation 9 given below:

$$\alpha = y - \beta x \quad (9)$$
$$= 44.7 - 7.55(5.915)$$
$$= 0.04$$

Thus, when values of α and β have been derived, the equation 7 is used to determine values of y, based on predicted values of x. By way of an example, when the value of x is 2 MB of data dropped, the value of y is computed as 15.14 seconds of time that is required to drop packets, as depicted below:

$$y = \alpha + \beta(x) = 0.04 + 7.55(2) = 15.14$$

Similarly, for different values of x, the computed values of y are depicted below:

$$y = \alpha + \beta(x) = 0.04 + 7.55(6) = 45.34 \text{ sec [when } x=6]$$

$$y = \alpha + \beta(x) = 0.04 + 7.55(4.5) = 34 \text{ sec [when } x=4.5]$$

$$y = \alpha + \beta(x) = 0.04 + 7.55(5.2) = 39.3 \text{ sec [when } x=5.2]$$

$$y = \alpha + \beta(x) = 0.04 + 7.55(6.9) = 52.135 \text{ sec [when } x=6.9]$$

$$y = \alpha + \beta(x) = 0.04 + 7.55(8.4) = 63 \text{ sec [when } x=8.4]$$

$$y = \alpha + \beta(x) = 0.04 + 7.55(4.7) = 35.525 \text{ sec [when } x=4.7]$$

$$y = \alpha + \beta(x) = 0.04 + 7.55(7.3) = 55.16 \text{ sec [when } x=7.3]$$

$$y = \alpha + \beta(x) = 0.04 + 7.55(11.4) = 86.11 \text{ sec [when } x=11.4]$$

Once future values for the one or more dependent variables have been predicted, a plurality of packets to be transmitted are clustered, at step 410, into, a plurality of categories based on the future values. In an embodiment, the plurality of packets to be transmitted are the packets that remain after one or more recurrent packets have been regenerated, as explained in detail in conjunction with FIG. 2. Alternatively, the plurality of packets may include one or more recurrent packets, which may be regenerated when the plurality of packets may be being transmitted. The remaining packets may then be transmitted based on associated category from the plurality of categories.

The plurality of categories includes a high delay category, a moderate delay category, and a least delay category. The clustering includes classifying each of the plurality of packets to be transmitted based on a first predefined value range, a second predefined value range, and a third predefined value range. The first predefined value range of each of the plurality of dependent variables is associated with the high delay category. The second predefined value range of each of the plurality of dependent variables is associated with the moderate delay category. Further, the third predefined value range of each of the plurality of dependent variables is associated with the least delay category. By way of an example, clustering into the plurality of categories may be based on the dependent variables of traversal time and propagation delay. These categories have been explained in detail in conjunction with FIG. 2.

At step 412, each of the plurality of packets are transmitted based on an associated category from the plurality of categories. By way of an example, when a path is idle or near to idle, packets clustered under the high latency category are send with high priority. By way of another example, when the path is 50% busy, packets clustered under the low latency category are sent, thereby streamlining the overall performance.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
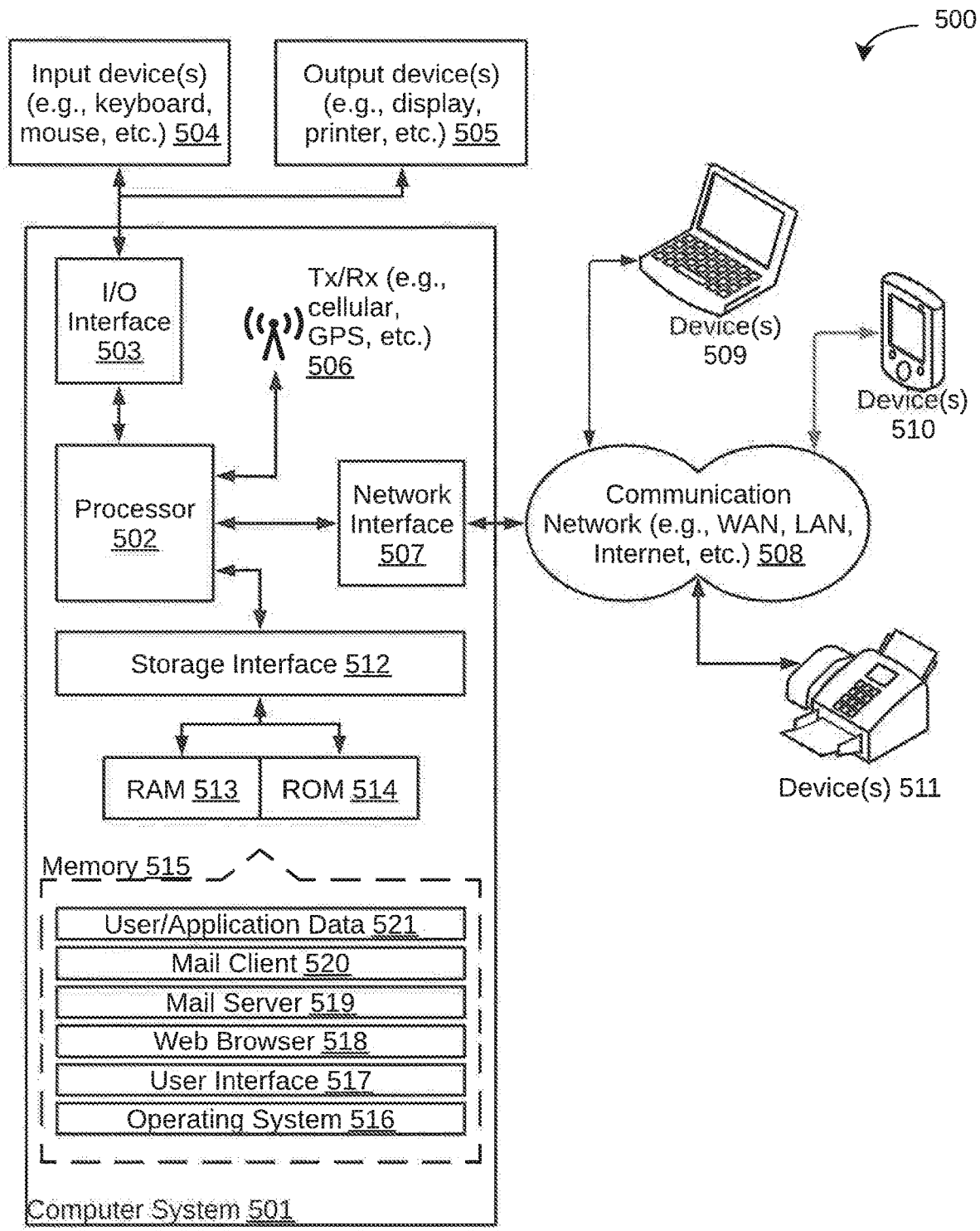
FIG. 5 is a block diagram of an exemplary computer system for implementing embodiments.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for improving performance of an ANN. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NFC®), FireWire®, Camera Link®, GigE™, serial bus, universal serial bus (USB®), infrared, PS/2®, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM®), long-term evolution (LTE), WiMAX, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB®), fiber channel, small computer systems interface (SCSI), STD Bus, RS-232, RS-422, RS-485, I2C, SPI, Microwire, 1-Wire, IEEE 1284, Intel® QuickPathInterconnect, Infini-Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AFRO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., weight matrix for a ANN, predefined weight for generating modified weight matrix, modified weight matrix, input vector, dominance matrix based on the contribution factor, rank of each neural node based on the corresponding dominance factor, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for verifying positive classification performed by ANN. by comparing rank and order of the dominance factor of the neural node. The techniques may improve efficiency of the ANN by verifying the false positive which leads to lesser error rate. Moreover, the techniques may be easily deployed in any cloud based servers for access and use as an 'application as a service' by any computing device including mobile device. For example, the ANN improvement engine may be implemented on a cloud based server and used for improving performance of various ANN based mobile device applications.

Various embodiments provide method and system for transmitting packets within a network. In particular, the method injects more intelligence for swift transmission of data packets to the destination. The method helps understand the traversed packets delay time and dispatches packets accordingly. Use of neural networks enables modulation of the speed of packets anywhere at any node in the network. Retransmission of packets after timeout consumes a dual set of data, thereby increasing cost for a consumer. The proposed method helps to reduce the wait time and provides high throughput to an end user, as packets never collides with each other because of the proposed method. This is enabled by understanding past packets traversal time and predicting the same for current packet that are ready to be sent, which is then used to modulate speed of packets before transmitting to a destination node.

The specification has described method and system for transmitting packets within a network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of transmitting packets within a network comprising a plurality of switches, the method comprising:
   determining, by a network device, frequency and sequence of transmission for a plurality of packets within the network;
   identifying, by the network device, a set of recurrent packets from the plurality of packets based on the determined frequency and sequence of transmission;

training, by the network device, a neural network based on the identified set of recurrent packets to identify recurrent packets;

generating, by the network device, a packet checkpoint based on the trained neural network, wherein generating further comprises updating the packet checkpoint, wherein the packet checkpoint are stored within each of the plurality of switches; and regenerating, by the network device, one or more of the set of recurrent packets in response to a request for the set of recurrent packets, based on the packet checkpoint, wherein the request for the one or more of the set of recurrent packets is generated by a source switch for a destination node, and wherein the one or more of the set of recurrent packets is regenerated by one of the source switch and an intermediate switch between the source switch and the destination node.

2. The method of claim 1, wherein at least one of the plurality of switches regenerates one or more of the set of recurrent packets based on the packet checkpoint.

3. The method of claim 1, wherein identification of the set of recurrent packets is based on:
comparison of the frequency of transmission of the plurality of packets with a predefined frequency threshold; and
comparison of a frequency of a set of packets from the plurality of packets being transmitted in a sequence, with a predefined sequence threshold.

4. The method of claim 3, wherein the set of recurrent packets match each of the predefined frequency threshold and the predefined sequence threshold.

5. The method of claim 1, further comprising initializing a plurality of network parameters associated with the plurality of switches into a plurality of dependent variables and a plurality of independent variables for each of the plurality of switches, wherein the plurality of network parameters is derived from the plurality of packets.

6. The method of claim 5, further comprising performing multilinear regression analysis on at least one of the plurality of dependent variables and at least one of the plurality of independent variables.

7. The method of claim 6, further comprising training the neural network to predict a future value for the at least one dependent variable, based on the performed multilinear regression.

8. The method of claim 7, further comprising clustering each of the plurality of packets into a plurality of categories based on the future value predicted for the at least one dependent variable, and wherein the clustering comprises classifying each of the plurality of packets based on a first predefined value range, a second predefined value range, and a third predefined value range.

9. The method of claim 8, wherein the plurality of categories comprises a high delay category, a moderate delay category, and a least delay category, wherein the first predefined value range of each of the plurality of dependent variables is associated with the high delay category, the second predefined value range of each of the plurality of dependent variables is associated with the moderate delay category, and the third predefined value range of each of the plurality of dependent variables is associated with the least delay category.

10. A system comprising a network device for transmitting packets within a network comprising a plurality of switches, the system comprising:

a processor; and
a memory communicatively coupled to the processor, wherein the memory stores processor instructions, which, on execution, causes the processor to:
determine frequency and sequence of transmission for a plurality of packets within the network;
identify a set of recurrent packets from the plurality of packets based on the determined frequency and sequence of transmission;
train a neural network based on the identified set of recurrent packets to identify recurrent packets;
generate a packet checkpoint based on the trained neural network, wherein the processor instructions further cause the processor to store the packet checkpoint within each of the plurality of switches; and
regenerate one or more of the set of recurrent packets in response to a request for the set of recurrent packets by the network device, based on the packet checkpoint, wherein the request for the one or more of the set of recurrent packets is generated by a source switch for a destination node, and wherein the one or more of the set of recurrent packets is regenerated by one of the source switch and an intermediate switch between the source switch and the destination node.

11. The system of claim 10, wherein at least one of the plurality of switches regenerates one or more of the set of recurrent packets based on the packet checkpoint.

12. The system of claim 10, wherein identification of the set of recurrent packets is based on:
comparison of the frequency of transmission of the plurality of packets with a predefined frequency threshold; and
comparison of a frequency of a set of packets from the plurality of packets being transmitted in a sequence, with a predefined sequence threshold, wherein the set of recurrent packets match each of the predefined frequency threshold and the predefined sequence threshold.

13. The system of claim 10, wherein the processor instructions further cause the processor to initialize a plurality of network parameters associated with the plurality of switches into a plurality of dependent variables and a plurality of independent variables for each of the plurality of switches, wherein the plurality of network parameters is derived from the plurality of packets.

14. The system of claim 13, wherein the processor instructions further cause the processor to perform multilinear regression analysis on at least one of the plurality of dependent variables and at least one of the plurality of independent variables.

15. The system of claim 14, wherein the processor instructions further cause the processor to train the neural network to predict a future value for the at least one dependent variable, based on the performed multilinear regression.

16. The system of claim 15, wherein the processor instructions further cause the processor to cluster each of the plurality of packets into a plurality of categories based on the future value predicted for the at least one dependent variable, and wherein the clustering comprises classifying each of the plurality of packets based on the first predefined value range, the second predefined value range, and the third predefined value range.

17. The system of claim 16, wherein the plurality of categories comprises a high delay category, a moderate delay category, and a least delay category, wherein the first predefined value range of each of the plurality of dependent variables is associated with the high delay category, the second predefined value range of each of the plurality of dependent variables is associated with the moderate delay category, and the third predefined value range of each of the plurality of dependent variables is associated with the least delay category.

18. A non-transitory computer-readable storage medium having stored thereon, a set of computer-executable instructions causing a computer comprising one or more processors to perform steps comprising:
   determining frequency and sequence of transmission for a plurality of packets within the network;
   identifying a set of recurrent packets from the plurality of packets based on the determined frequency and sequence of transmission;
   training a neural network based on the identified set of recurrent packets to identify recurrent packets;
   generating a packet checkpoint based on the trained neural network, wherein the processor instructions further cause the processor to store the packet checkpoint within each of the plurality of switches; and
   regenerating one or more of the set of recurrent packets in response to a request for the set of recurrent packets, based on the packet checkpoint, wherein the request for the one or more of the set of recurrent packets is generated by a source switch for a destination node, and wherein the one or more of the set of recurrent packets is regenerated by one of the source switch and an intermediate switch between the source switch and the destination node.

* * * * *